US012737431B2

(12) United States Patent
Cemgil et al.

(10) Patent No.: US 12,737,431 B2
(45) Date of Patent: Sep. 15, 2026

(54) GENERATING DIFFERENTIABLE ORDER STATISTICS USING SORTING NETWORKS

(71) Applicant: GDM Holding LLC, Mountain View, CA (US)

(72) Inventors: Ali Taylan Cemgil, London (GB); Krishnamurthy Dvijotham, London (GB); Arnaud Doucet, Oxford (GB); Jamie Hayes, Manchester (GB)

(73) Assignee: GDM Holding LLC, Mountain View, CA (US)

( * ) Notice: Subject to any disclaimer, the term of this patent is extended or adjusted under 35 U.S.C. 154(b) by 473 days.

(21) Appl. No.: 18/275,737

(22) PCT Filed: Feb. 7, 2022

(86) PCT No.: PCT/EP2022/052896
§ 371 (c)(1),
(2) Date: Aug. 3, 2023

(87) PCT Pub. No.: WO2022/167660
PCT Pub. Date: Aug. 11, 2022

(65) Prior Publication Data
US 2024/0143696 A1 May 2, 2024

Related U.S. Application Data

(60) Provisional application No. 63/146,391, filed on Feb. 5, 2021.

(51) Int. Cl.
*G06F 17/18* (2006.01)

(52) U.S. Cl.
CPC .................................... *G06F 17/18* (2013.01)

(58) Field of Classification Search
CPC ............ G06N 3/04; G06N 3/09; G06N 3/084; G06N 3/0442; G06N 3/0464; G06N 20/00; G06F 17/18
(Continued)

(56) References Cited

U.S. PATENT DOCUMENTS 11,657,268 B1 * 5/2023 Refaat .................... G06N 3/008 706/18
2020/0372099 A1 * 11/2020 Anderson ............ G06F 7/4876

OTHER PUBLICATIONS

Adams et al., "Ranking via sinkhorn propagation" CoRR, Submitted on Jun. 2011, arXiv:1106.1925v2, 12 pages.

(Continued)

*Primary Examiner* — John H Le
(74) *Attorney, Agent, or Firm* — Fish & Richardson P.C.

(57) ABSTRACT

Methods, systems, and apparatus, including computer programs encoded on a computer storage medium, for generating one or more differentiable order statistics for a vector of scores. In one aspect, a method comprises: obtaining the vector of scores, wherein each position in the vector of scores is associated with a respective index from a set of indices; obtaining a plurality of pairs of indices; generating a respective swapping probability for each pair of indices based on the vector of scores; generating, for each pair of indices, a respective soft-swapping matrix for the pair of indices as a combination of: (i) an identity matrix, and (ii) an exchange matrix, wherein the exchange matrix is weighted in the combination by the swapping probability for the pair of indices; and generating the one or more differentiable order statistics for the vector of scores using the soft-swapping matrices.

20 Claims, 5 Drawing Sheets

(58) Field of Classification Search
USPC .......................................................... 702/179
See application file for complete search history.

(56) References Cited

OTHER PUBLICATIONS

Batcher, "Sorting networks and their applications" Proceedings of the Apr. 30-May 2, 1968, spring joint computer conference, Apr.-May 1968, 307-314.
Berrada et al., "Smooth loss functions for deep top-k classification" CoRR, Submitted on Feb. 2018, arXiv:1802.07595v1, 25 pages.
Blondel et al., "Fast differentiable sorting and ranking." International Conference on Machine Learning. PMLR, Nov. 2020, 10 pages.
Bose et al., "A sorting problem." Journal of the ACM (JACM) 9.2, Apr. 1962, 282-296.
Cuturi et al., "Differentiable ranks and sorting using optimal transport" In Advances in Neural Information Processing Systems (NeurIPS) 32, 2019, 11 pages.
Github.com [online], "JAX: composable transformations of Python+ NumPy programs" Nov. 2018, retrieved on Sep. 4, 2024, retrieved from URL <http://github.com/google/jax>, 8 pages.
Goemans, "Smallest compact formulation for the permutahedron" Mathematical Programming 153.1, Oct. 2015, 6 pages.
Grover et al., "Stochastic optimization of sorting networks via continuous relaxations" CoRR, Submitted on Apr. 2019, arXiv:1903.08850v2, 23 pages.
International Preliminary Report on Patentability in International Appln. No. PCT/EP2022/052896, mailed on Aug. 17, 2023, 9 pages.
International Search Report and Written Opinion in International Appln. No. PCT/EP2022/052896, mailed on Jun. 15, 2022, 14 pages.
Johnhw.github.io [online], "Differentiable parallel approximate sorting networks" 2020, retrieved on Sep. 4, 2024, retrieved from URL <https://johnhw.github.io/differentiable_sorting/index.md.html>, 10 pages.
Kingma et al., "Adam: A method for stochastic optimization" CoRR, Submitted on Jul. 2015, arXiv:1412.6980v8, 15 pages.
Lim et al., "Beyond the Birkhoff polytope: Convex relaxations for vector permutation problems" Advances in neural information processing systems 27, 2014, 9 pages.
Linderman et al., "Reparameterizing the birkhoff polytope for variational permutation inference." International Conference on Artificial Intelligence and Statistics, PMLR, Mar. 2018, 10 pages.
Mena et al., "Learning latent permutations with gumbel-sinkhorn networks" CoRR, Submitted on Feb. 2018, arXiv:1802.08665v1, 22 pages.
Paulus et al., "Gradient estimation with stochastic softmax tricks" Advances in neural information processing systems 33, 2020, 14 pages.
Peyré et al., "Computational optimal transport" CoRR, Submitted on Feb. 2019, arXiv:1803.00567v2, 208 pages.
Plackett, "The analysis of permutations" Journal of The Royal Statistical Society Series C-applied Statistics, 24, 1975, 193-202.
Shafer et al., "A tutorial on conformal prediction" Journal of Machine Learning Research, 9(3), Mar. 2008, 371-421.
Sinkhorn et al., "Concerning nonnegative matrices and doubly stochastic matrices" Pacific Journal of Mathematics, 1967, 21(2):343-348.
Steinwart et al., "Estimating conditional quantiles with the help of the pinball loss" Bernoulli 17 (1), 2011, 211-225.
Yu et al., "Bayesian quantile regression" Statistics & Probability Letters 54.4, Oct. 2001, 437-447.

* cited by examiner

100
INPUT 102
MACHINE LEARNING MODEL 104
SCORES 106
SORTING SYSTEM 200
ORDER STATISTICS 108
OBJECTIVE FUNCTION 112
TRAINING ENGINE 110
GRADIENTS 114

| Method | Training neighbour set size (n) | | | | | |
|---|---|---|---|---|---|---|
| | 100 | 1K | 5K | 10K | 15K | 20K |
| Ours | 97.00 | 97.12 | 96.60 | 95.63 | 95.27 | 88.52 |
| Grover et al. (2019) | 96.28 | 96.26 | 95.45 | 94.93 | 94.72 | 81.38 |

GENERATING DIFFERENTIABLE ORDER STATISTICS USING SORTING NETWORKS

CROSS-REFERENCE TO RELATED APPLICATION

This application is a National Stage Application under 35 U.S.C. § 371 and claims the benefit of International Application No. PCT/EP2022/052896, filed Feb. 7, 2022, which claims priority to U.S. Application No. 63/146,391, filed Feb. 5, 2021, the disclosure of which is incorporated herein by reference.

BACKGROUND

This specification relates to processing data using machine learning models.

Machine learning models receive an input and generate an output, e.g., a predicted output, based on the received input. Some machine learning models are parametric models and generate the output based on the received input and on values of the parameters of the model.

Some machine learning models are deep models that employ multiple layers of models to generate an output for a received input. For example, a deep neural network is a deep machine learning model that includes an output layer and one or more hidden layers that each apply a non-linear transformation to a received input to generate an output.

SUMMARY

This specification generally describes a system implemented as computer programs on one or more computers in one or more locations that can train a machine learning model using gradients of an objective function that depends on differentiable order statistics.

Throughout this specification, a vector of scores can be understood as being indexed by a set of indices, i.e., such that each score in the vector of scores is associated with a respective index from the set of indices. For example, a vector of N scores can be indexed by the set of integer indices {1, . . . , N}.

A so-called "order statistic" for a vector of scores can broadly refer to any statistic characterizing the vector of scores that depends, e.g., on the ranking (ordering) of the scores in the vector of scores. A few examples of order statistics for a vector of scores can include: the maximum score in the vector of scores; the index of the maximum score in the vector of scores; the minimum score in the vector of scores; the index of the minimum score in the vector of scores; the median score in the vector of scores; the index of the median score in the vector of scores; a sorted version of the vector of scores (e.g., sorted in descending or ascending order); a rank ordering of the indices of the scores in the vector of scores (i.e., a sorted version of the indices where each index is ranked based on the value of the corresponding score in the vector of scores); the top K scores in the vector of scores (where K is a positive integer value); the indices of the top K scores in the vector of scores; and the components of a "sorting permutation" matrix that, if applied to the vector of scores, generates a sorted vector of scores that is ordered, e.g., in descending or ascending order. That is, in some instances one or more order statistics of a vector of scores may be defined by one or more of the scores themselves.

An "embedding" refers to an ordered collection of numerical values, e.g., a vector, matrix, or other tensor of numerical values.

According to a first aspect, there is provided a method performed by one or more data processing apparatus for generating one or more differentiable order statistics for a vector of scores, the method comprising: obtaining the vector of scores, wherein each position in the vector of scores is associated with a respective index from a set of indices; obtaining a plurality of pairs of indices, wherein each pair of indices comprises a respective first index and a respective second index from the set of indices; generating a respective swapping probability for each pair of indices based on the vector of scores; generating, for each pair of indices, a respective soft-swapping matrix for the pair of indices as a combination of: (i) an identity matrix that, if applied to the vector of scores, would leave the vector of scores unchanged, and (ii) an exchange matrix that, if applied to the vector of scores, would swap a pair of scores indexed by the pair of indices, wherein the exchange matrix is weighted in the combination by the swapping probability for the pair of indices; and generating the one or more differentiable order statistics for the vector of scores using the soft-swapping matrices.

In some implementations, obtaining the vector of scores comprises generating each score in the vector of scores as an output of a machine learning model having a plurality of machine learning model parameters.

In some implementations, the method further comprises training the machine learning model parameters using an objective function that depends on the differentiable order statistics, comprising: determining gradients of the differentiable order statistics with respect to the machine learning model parameters; and updating values of the machine learning model parameters using the gradients of the differentiable order statistics with respect to the machine learning model parameters.

In some implementations, the differentiable order statistics include a top-K order statistic that defines whether a target index is included in a set of indices of the K highest scores from the vector of scores.

In some implementations, the machine learning model comprises a neural network.

In some implementations, the respective swapping probability for each pair of indices is strictly greater than zero and strictly less than one.

In some implementations, for each pair of indices, the soft-swapping matrix for the pair of indices is generated as:

$$(1-\rho)I+\rho E,$$

wherein $\rho$ is the swapping probability, I is the identity matrix, and E is the exchange matrix.

In some implementations, the plurality of pairs of indices are associated with a sequential ordering, wherein the swapping probabilities for the pairs of indices are sequentially generated starting from a first pair of indices in the sequential ordering of the pairs of indices, and wherein for each pair of indices, generating the swapping probability for the pair of indices comprises: determining the swapping probability for the pair of indices based on a pair of scores indexed by the pair of indices in a current copy of the vector of scores; and applying a swapping operator associated with the pair of indices to the current copy of the vector of scores, wherein the swapping operator is from a sequence of swapping operators that define a sorting network.

In some implementations, applying the swapping operator associated with the pair of indices to the current copy of the vector of scores comprises: evaluating an inequality between the pair of scores indexed by the pair of indices in the current copy of the vector of scores; and in response to determining that the inequality is satisfied, swapping the pair of scores indexed by the pair of indices in the current copy of the vector of scores.

In some implementations, generating the swapping probability for a final pair of indices comprises applying a final swapping operator to the current copy of the vector of scores, and wherein after applying the final swapping operator, the scores in the current copy of the vector of scores are sorted.

In some implementations, for each pair of indices, determining the swapping probability for the pair of indices based on the pair of scores indexed by the pair of indices in a current copy of the vector of scores, comprises: determining a difference between the pair of scores indexed by the pair of indices in the current copy of the vector of scores; determining a product of an inverse of a dispersion factor and the difference between the pair of scores indexed by the pair of indices in the current copy of the vector of scores; and determining the swapping probability by applying a sigmoid function to a result of the product.

In some implementations, the method further comprises obtaining a sorted version of the vector of scores; and wherein for each pair of indices, determining the swapping probability for the pair of indices based on the pair of scores indexed by the pair of indices in the current copy of the vector of scores, comprises: determining an error between: (i) the pair of scores indexed by the pair of indices in the current copy of the vector of scores, and (ii) a pair of scores indexed by the pair of indices in the sorted version of the vector of scores; and determining the swapping probability based on the error.

In some implementations, for each pair of indices, determining the error between: (i) the pair of scores indexed by the pair of indices in the current copy of the vector of scores, and (ii) the pair of scores indexed by the pair of indices in the sorted version of the vector of scores, comprises: determining a cost matrix $[C_{ij}]_{i,j=1,2}$, where $C_{ij}=h(y_i-x_j)$, $[x_1, x_2]$ are the pair of scores indexed by the pair of indices in the current copy of the vector of scores, $[y_1, y_2]$ are the pair of scores indexed by the pair of indices in the sorted version of the vector of scores, and $h(\cdot)$ is a convex and non-negative function.

In some implementations, for each pair of indices, determining the swapping probability based on the error comprises determining the swapping probability $\lambda$ as:

$$\lambda = \frac{\exp\left(\frac{C_{ii}+C_{jj}}{\epsilon}\right)}{\exp\left(\frac{C_{ii}+C_{jj}}{\epsilon}\right)+\exp\left(\frac{C_{ij}+C_{ji}}{\epsilon}\right)}$$

where $\epsilon$ is a dispersion factor.

In some implementations, generating the one or more differentiable order statistics for the vector of scores using the soft-swapping matrices comprises: generating a matrix product of the soft-swapping matrices; and generating the one or more differentiable order statistics based on the matrix product of the soft-swapping matrices.

In some implementations, one or more differentiable order statistics comprise a sorted version of the vector of scores, and wherein generating the sorted version of the vector of scores comprises: determining a product of: (i) the matrix product of the soft-swapping matrices, and (ii) the vector of scores.

In some implementations, one or more differentiable order statistics comprise a maximum score in the vector of scores, and wherein generating the maximum score in the vector of scores comprises: determining a product of: (i) a transpose of a final column of an identity matrix, (ii) the matrix product of the soft-swapping matrices, and (iii) the vector of scores.

In some implementations, one or more differentiable order statistics comprise a minimum score in the vector of scores, and wherein generating the minimum sore in the vector of scores comprises: determining a product of: (i) a transpose of a first column of an identity matrix, (ii) the matrix product of the soft-swapping matrices, and (iii) the vector of scores.

According to another aspect, there are provided one or more non-transitory computer storage media storing instructions that when executed by one or more computers cause the one or more computers to perform operations of the methods described herein.

According to another aspect, there is provided a system comprising: one or more computers; and one or more storage devices communicatively coupled to the one or more computers, wherein the one or more storage devices store instructions that, when executed by the one or more computers, cause the one or more computers to perform operations of the methods described herein.

Particular embodiments of the subject matter described in this specification can be implemented so as to realize one or more of the following advantages.

The system described herein can process a vector of scores to generate differentiable order statistics for the vector of scores. Order statistics can be referred to as differentiable if they allow for computation of gradients (derivatives), e.g., with respect to the parameters of a differentiable machine learning model (e.g., neural network) that generated the vector of scores. The system can use the differentiable order statistics to directly train the machine learning model to optimize an objective function that depends on the order statistics by computing gradients of the objective function and using the gradients to update the parameters of the machine learning model. In contrast, some other systems generate order statistics using non-differentiable procedures that generate non-differentiable order statistics and therefore do not allow for gradient-based optimization of objective functions that depend on the non-differentiable order statistics. By enabling gradient-based optimization based on objective functions that depend on order statistics, the system can enable machine learning models to be trained on a broader class of objective functions and to achieve an acceptable performance (e.g., prediction accuracy) over fewer training iterations and using less training data.

The system described herein can generate differentiable order statistics while consuming fewer computational resources (e.g., memory and computing power) than some other systems that generate order statistics. For example, the system described herein can generate differentiable order statistics by a procedure with computational complexity on the order of $O(n(\log n)^2)$, compared to other systems that have higher computational complexity on the order of $O(n^2)$.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
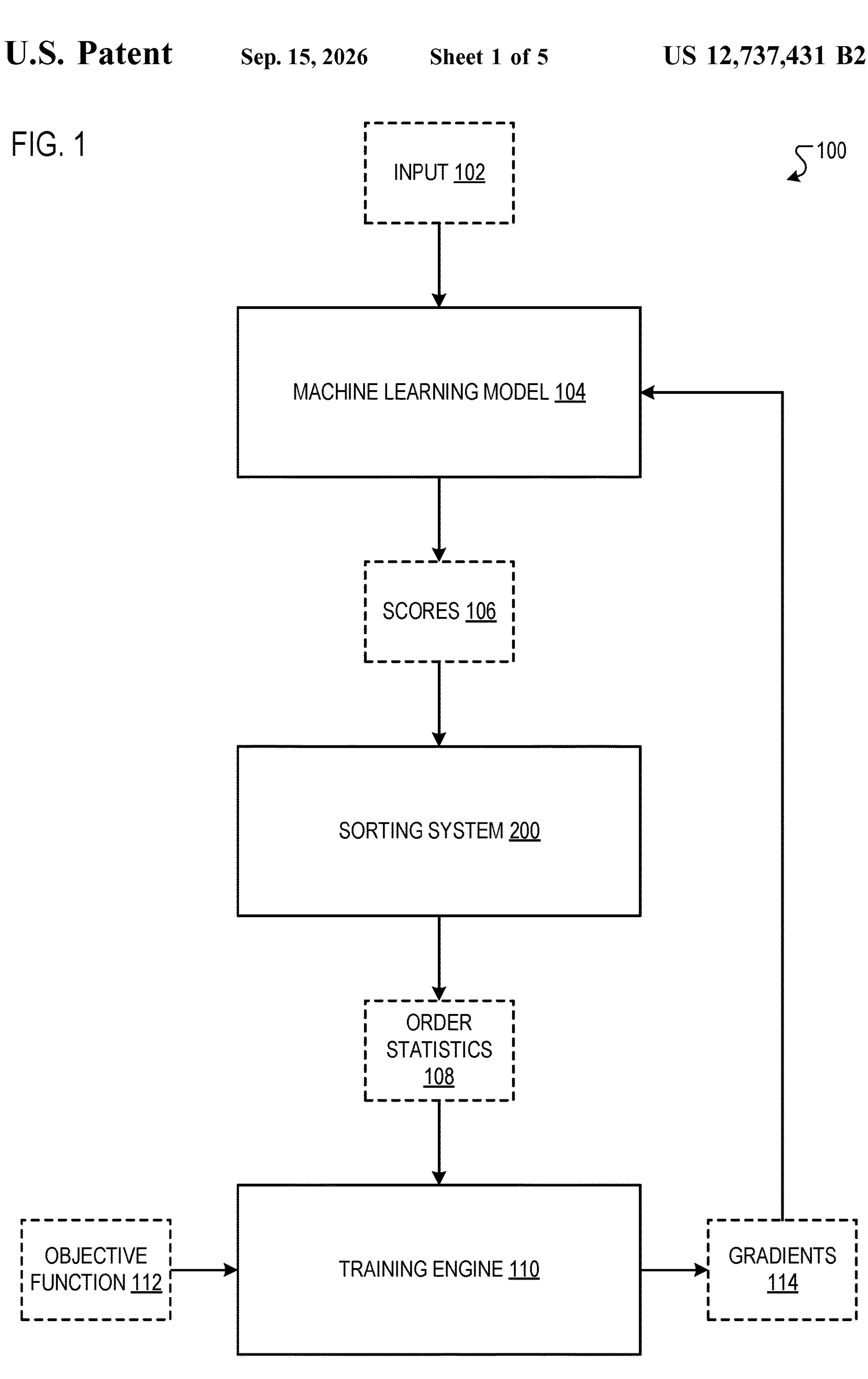
FIG. 1 shows an example machine learning environment.

FIG. 1 shows an example machine learning environment 100, including a machine learning model 104, a sorting system 200, and a training engine 110. The sorting system 200 enables the training engine 110 to train the machine learning model 104 to optimize an objective function that depends on order statistics derived from the output of the machine learning model 104, as will be described in more detail next.

The machine learning model 104 is configured to perform a machine learning task, in particular, by processing an input 102, in accordance with values of a set of machine learning model parameters, to generate an output that includes a vector (e.g., array) of scores 106.

Generally, the machine learning model can be configured to perform any of a variety of possible machine learning tasks. Some examples of machine learning tasks that the machine learning model can be configured to perform are described next.

As one example, the task may be a machine translation task. For example, if the input to the machine learning model is a sequence of text, e.g., a sequence of words, phrases, characters, or word pieces, in one language, the output generated by the machine learning model can be a score for each of a set of pieces of text in another language. The score for each piece of text can represent an estimated likelihood that the piece of text is a correct translation of the input sequence of text.

As another example, the task may be an audio processing task. For example, if the input to the machine learning model is a sequence representing a spoken utterance, e.g. a time sequence of audio signal values or a time sequence of frequency spectra, the output may be a score for each of a set of categories representing a likelihood that the category correctly categorizes the utterance. For example, if the input to the machine learning model is a sequence representing a spoken utterance, the output generated by the machine learning model may be a score for each of a set of pieces of text, each score representing an estimated likelihood that the piece of text is the correct transcript for the utterance. As another example, if the input to the machine learning model is a sequence representing a spoken utterance, the output generated by the machine learning model can include a respective score for each word or phrase in a set of words or phrases (e.g., "hotwords"). The score for a word or phrase can represent the likelihood that the word or phrase was spoken in the utterance. As another example, if the input to the machine learning model is a sequence representing a spoken utterance, the output generated by the machine learning model can include a respective score for each natural language in a set of natural languages. The score for each natural language can represent a likelihood that the utterance was spoken in the natural language.

As another example, the task can be a health prediction task, where the input is a sequence derived from electronic health record data for a patient and the output is a prediction that is relevant to the future health of the patient. For example, the machine learning model can generate a respective score for each treatment in a set of possible treatments, where the score for a treatment represents a likelihood that the treatment should be prescribed to the patient.

As another example, the task can be a text generation task, where the input is a sequence of text, and the output includes a respective score for each of multiple pieces of text, where the score for each piece of text represents a likelihood that the piece of text is a completion of the input sequence of text.

As another example, the task can be an image or video processing task, where the input comprises pixels of an image or of a sequence of images, and where the output may be a score for each of a set of categories representing a likelihood that the category correctly categorizes the image, or one or more pixels of the image, or the sequence of images. For example, the task can be an image segmentation task, where the input is an image and the output includes, for each pixel of the image, a respective score for each of multiple possible pixel classes (e.g., sky, ground, vehicle, building, etc.). The score for each pixel class can represent the likelihood that the pixel is included in the pixel class.

As another example, the task can be an image classification task, where the input is an image and the output includes a respective score for each of multiple possible object classes (e.g., dog, cat, vehicle, etc.). The score for each object class can represent the likelihood that the image depicts an object that is included in the object class.

As another example, the task can be a protein function prediction task, where the input is a representation of a protein (e.g., a representation of the amino acid sequence of the protein), and the output includes a respective score for each protein function in a set of possible protein functions. The score for a protein function can represent a likelihood that the protein has the protein function.

As another example, the task can be a video processing task, where the input to the machine learning model includes a video and the output generated by the machine learning model includes a score for each class in a set of classes. Each class can correspond to, e.g., a respective action (e.g., sitting, walking, running, etc.), and the score for each class can represent a likelihood that the video shows a person performing the corresponding action.

In some cases, the machine learning task is a combination of multiple individual machine learning tasks, i.e., the system is configured to perform multiple different individual machine learning tasks, e.g., two or more of the machine learning tasks mentioned above. For example, the system can be configured to perform multiple individual natural language understanding tasks, with the network input including an identifier for the individual natural language understanding task to be performed on the network input.

The machine learning model 104 is generally a differentiable model, i.e., having a configuration that enables computation of gradients of a vector of scores 106 generated by the machine learning model with respect to the model parameters of the machine learning model 104.

In particular, the machine learning model 104 can include a neural network having any appropriate neural network architecture. More specifically, the neural network architecture of the neural network can include any appropriate neural network layers (e.g., fully-connected layers, convolutional layers, attention layers, etc.) in any appropriate numbers (e.g., 2 layers, 5 layers, or 10 layers) and connected in any appropriate configuration (e.g., as a linear sequence of layers). The machine learning model parameters of a machine learning model implemented as a neural network can include, e.g., weight matrices, bias vectors, or both, associated with each neural network layer of the neural network. A general model of this type may be used to perform any of the previously described tasks, e.g. an audio processing task or an image processing task.

In a specific example, the machine learning model can be implemented as a convolutional neural network (e.g., that includes one or more convolutional neural network layers) or an attention-based neural network (e.g., that includes one or more self-attention neural network layers, one or more cross-attention neural network layers, or both, e.g., a transformer neural network) that are configured to perform an image processing task, e.g., image classification or image segmentation.

In another specific example, the machine learning model can be implemented as a convolutional neural network, an attention-based neural network, a multi-layer perceptron, or a recurrent neural network (e.g., that includes one or more recurrent neural network layers, e.g., long short-term memory (LSTM) or gated recurrent unit (GRU) layers) that are configured to perform an audio processing task, e.g., speech recognition or language recognition, or a text processing task, e.g., machine translation, as described above.

The sorting system 200 is configured to process a vector of scores 106 to generate one or more order statistics 108 of the vector of scores 106. As described above, each order statistic 108 is a statistic, characterizing the vector of scores 106, that depends on the ranking (ordering) of the scores in the vector of scores 106. For example, the order statistics 108 can define a rank ordering of the indices of the scores in the vector of scores (i.e., a sorted version of the indices where each index is ranked based on the value of the corresponding score in the vector of scores). (As a particular example, for the vector of scores: [0.7, 0.1, 0.2], the rank ordering of the indices can be [1,3,2]). As another example, the order statistics can define a sorting permutation matrix that, if applied to the vector of scores, generates a sorted vector of scores.

In some cases, the order statistics 108 generated by the sorting system 200 can be approximations of the (true) order statistics of the vector of scores 106. The closeness of the approximation can be governed by the value of a "dispersion" hyper-parameter of the sorting system 200, as will be described in more detail below with reference to FIG. 2.

The sorting system generates the order statistics 108 as a differentiable function of the vector of scores 106, i.e., that enables computation of gradients of the order statistics 108 with respect to the scores 106. An example of a sorting system 200, i.e., that can compute differentiable order statistics 108 of a vector of scores 106, is described in more detail below with reference to FIG. 2.

The training engine 110 is configured to train the machine learning model 104 to optimize an objective function 112 that depends on the order statistics 108 of scores 106 generated by the machine learning model 104. In particular, the training engine 110 can train the machine learning model 104 on a set of training inputs over a sequence of training iterations.

At each training iteration, the training engine 110 can sample a batch (set) of "current" training inputs. For each current training input, the training engine 110 can process the training input using the machine learning model 104 to generate a vector of scores 106, and then process the vector of scores 106 using the sorting system 200 to generate order statistics 108.

The training engine 110 can then determine gradients 114 of an objective function 112 that depends on the order statistics 108 generated using the machine learning model 104 for the current training examples. The training engine 110 can determine the gradients 114 of the objective function 112 with respect to the model parameters of the machine learning model 104, e.g., by backpropagation. That is, the training engine 110 can backpropagate gradients through the sorting system 200 and into the machine learning model 104. The training engine 110 thus exploits the differentiability of the operations performed by the sorting system 200, i.e., to compute gradients of the objective function 112 with respect to the model parameters of the machine learning model 104.

After determining the gradients 114, the training engine 110 can use the gradients 114 to update the current values of the set of model parameters of the machine learning model. For example, the training engine 110 can update the current values of the model parameters of the machine learning model using an appropriate gradient descent optimization technique, e.g., Adam or RMSprop.

The objective function 112 can be any appropriate objective function that depends on order statistics 108 generated by the sorting system 200. For example where, as described above, the scores 106 define a score for each of a set of categories for the input to the machine learning model, e.g. in a classification task, the objective function that depends on the differentiable order statistics may characterize the scores for the categories. A few examples of possible objective functions 112 are described next.

In one example, the order statistics define a rank ordering of the indices of the scores in the vector of scores 106. In this example, for each training input, the objective function can measure an error between: (i) the rank ordering generated for the training input using the machine learning model, and (ii) a "target" rank ordering for the training input (e.g., that is specified by a user). The objective function can measure the error, e.g., by computing an inner product between: (i) a vector defining the rank ordering generated for the training input using the machine learning model, and (ii) the target rank ordering for the training input. In a particular example application, the machine learning model may process medical images to generate a respective score for each of multiple diagnoses, and the target rank ordering of the diagnoses for a medical image may define an ordering of the diagnoses from "most likely" to "least likely." This particular example can be generalized to non-medical images, to audio, and to the other previously described machine learning tasks.

In another example, the objective function is a "k-nearest neighbors" objective function. More specifically, in this example, the machine learning model can be configured to receive a set of inputs that includes: (i) a "query" input, and (ii) a set of n "candidate" inputs. The machine learning model can process each input in the set of inputs to generate a respective embedding of the input. The machine learning model 104 can generate a respective score for each candidate input by determining a distance (e.g., a Euclidean distance) between: (i) the embedding of the candidate input, and (ii) the embedding of the query input. The sorting system 200 can process the scores to generate an (approximate) sorting permutation matrix that, if applied to the vector of scores, generates a sorted vector of scores. In this example, the objective function $\mathcal{L}$ can be given by:

$$\mathcal{L} = (P, y, y_1, y_2, \ldots, y_n) = -\frac{1}{k}\sum_{j=1}^{k}\sum_{i=1}^{n}\mathbb{I}(y_i = y)P[i, j] \quad (1)$$

where P denotes the sorting permutation matrix, y is the label of the query input, $$(y_i)_{i=1}^{n}$$

are the labels of the candidate inputs, $\mathbb{I}(\cdot)$ is an indicator function that evaluates to 1 if its argument is true and 0 otherwise, and P[i,j] is the entry of sorting permutation matrix P at position [i,j].

The objective function described with reference to equation (1) measures approximately what fraction of the k "nearest neighbors" of the query input share the same label as the query input. (The k nearest neighbors of the query input refers to the k candidate inputs that are least distant from the query input). Thus training the machine learning model using the objective function described with reference to equation (1) (or an analogous objective function) causes the machine learning model to generate embeddings that can be used to perform k-nearest neighbor classification. Such a k-nearest neighbor classification can be applied to the previously described machine learning tasks.

In another example, the objective function is a "top-K classification loss" objective function. More specifically, in this example, the order statistic is a "top-K" order statistic that defines whether a target index is included in a set of indices (i.e., from the set of indices indexing the vector of scores) corresponding to the K scores with the highest values (i.e., where K is a positive integer value). In this example, the objective function can include a function of the top-K order statistic, e.g., a scaled version of the top-K order statistic. An example technique for generating a top-K order statistic is described in more detail below with reference to FIG. 2.

After training, the machine learning model 104 can be deployed for use in performing the machine learning task, e.g., in a data center, or on a mobile computing device (e.g., a smartphone or smartwatch).

Figure 2:
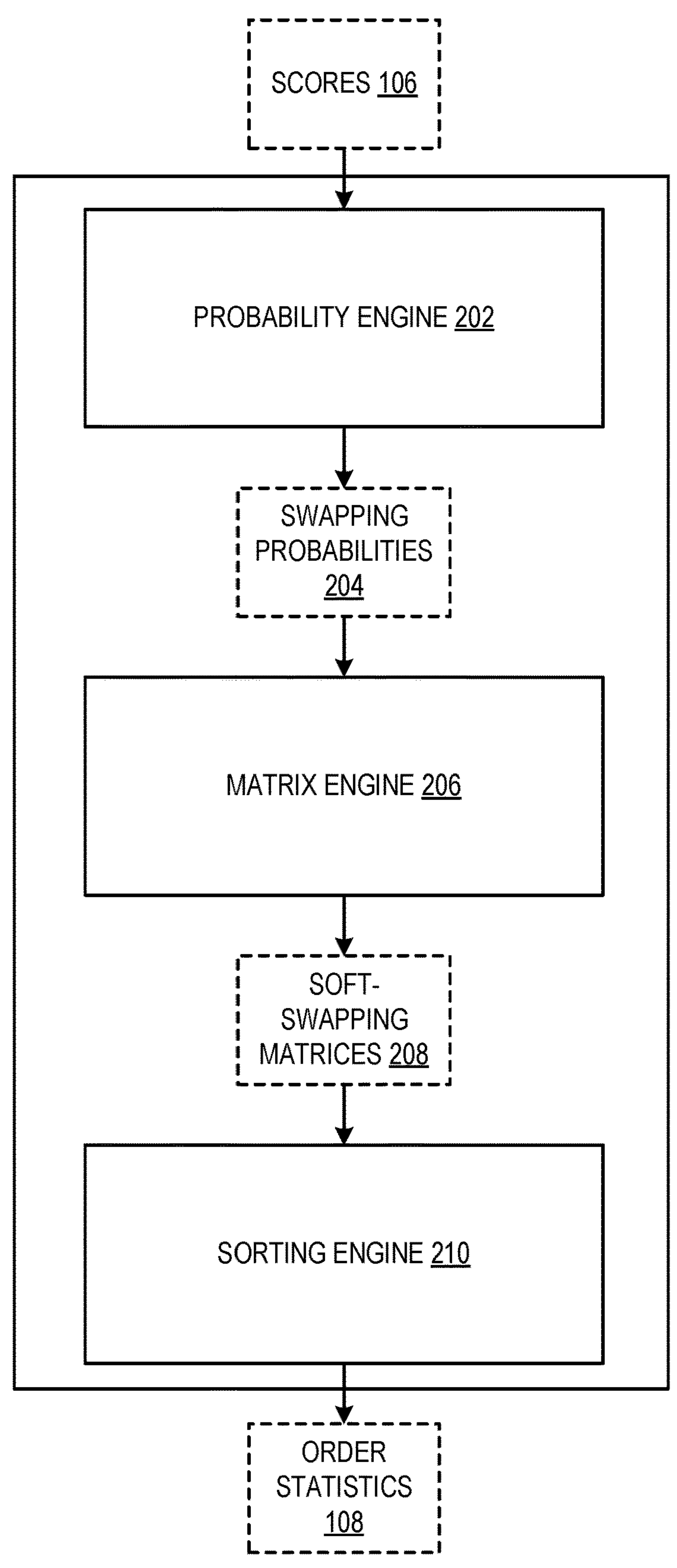
FIG. 2 shows an example sorting system.

FIG. 2 shows an example sorting system 200. The sorting system 200 is an example of a system implemented as computer programs on one or more computers in one or more locations in which the systems, components, and techniques described below are implemented.

The sorting system 200 is configured to process a vector of scores 106 to generate one or more differentiable order statistics 108 for the vector of scores. Each position in the vector of scores is associated with a respective index from a set of indices.

The sorting system 200 can receive the vector of scores 106, e.g., as the output of a machine learning model, and the sorting system 200 can provide the order statistics 108 to a training engine for use in training the machine learning model, as described above with reference to FIG. 1.

The sorting system 200 includes a probability engine 202, a matrix engine 206, and a sorting engine 210, which are each described in more detail next.

The probability engine 202 maintains a so-called "sorting network," i.e., a predefined sequence of pairs of indices, where each pair of indices includes a respective first index and a respective second index from the set of indices, i.e., that index the vector of scores. That is, the probability engine 202 maintains a sequence of pairs of indices $(e_1, \ldots, e_K)$, where each $e_k$ is a pair of indices of the form e=(i,j) with (i,j)∈{1, . . . , n}, where n is the number of scores in the vector of scores.

Figure 3:
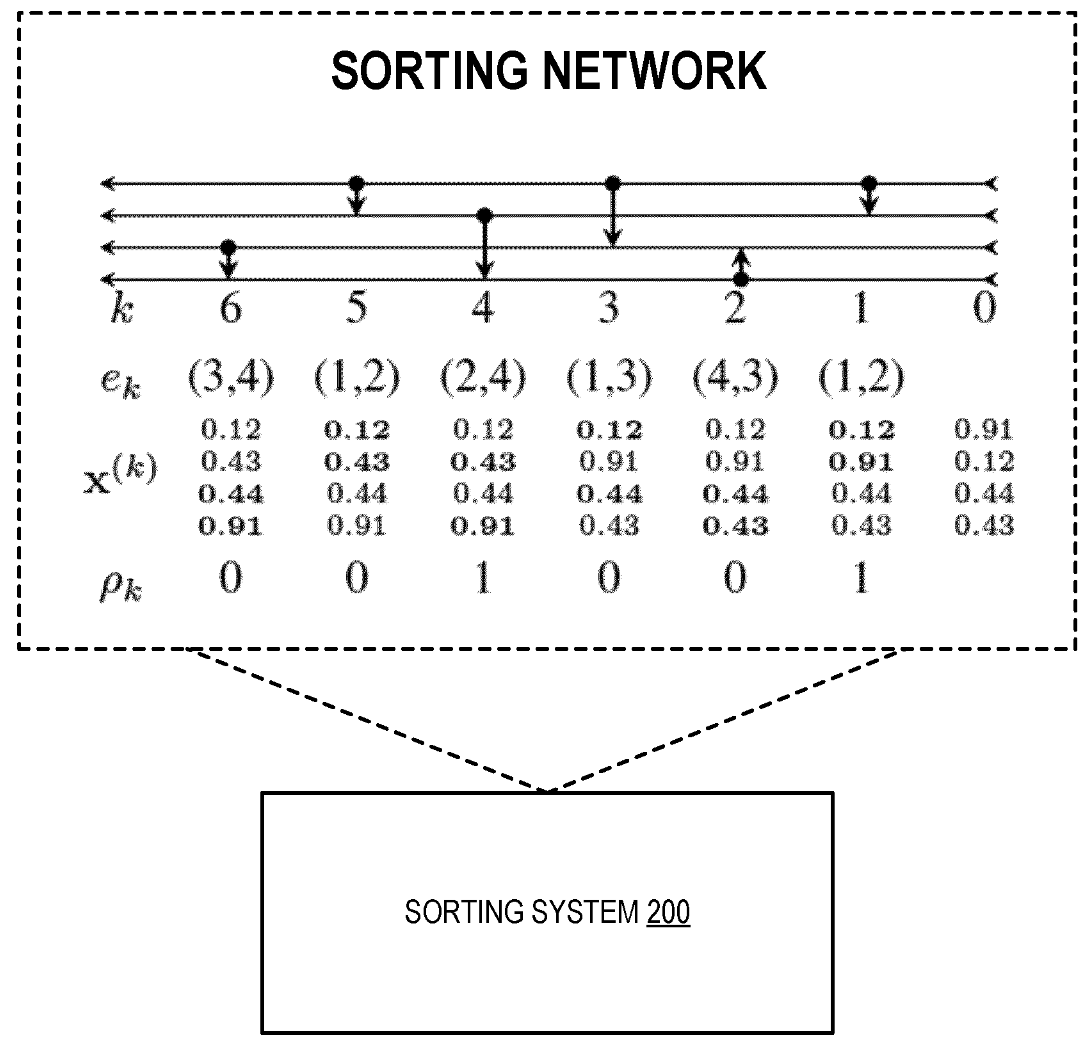
FIG. 3 illustrates the operation of a sorting network.

Each pair of indices in the sorting network defines a "swapping operator" that, when applied to the vector of scores, evaluates an inequality between the pair of scores indexed by the pair of indices. For example, the swapping operator defined by the pair of indices (i,j) can evaluate the inequality $x_i \geq x_j$, where $x_i$ is the score at index i in the vector of scores and $x_j$ is the score at index j in the vector of scores. In response to determining that the inequality is satisfied, the swapping operator updates the vector of scores by swapping the pair of scores indexed by the pair of indices. If the inequality is not satisfied, then the swapping operator refrains from updating the vector of scores. Applying the sorting network to any vector of scores (having a predefined length associated with the sorting network), i.e., by sequentially applying each swapping operator in the sorting network to the vector of scores, has the effect of sorting the entries of the vector of scores (though the result may not be a perfectly sorted version of vector of scores). FIG. 3, which illustrates the operations of a sorting network, is described in more detail below. Thus the sequential ordering that the plurality of pairs of indices is associated with may be a sequence of the swapping operators. In general the sequence of swapping operators may be defined by the sorting network.

The probability engine 202 can receive data defining the sorting network, e.g., from a user, and thereafter maintain (store) the data defining the sorting network. The techniques described herein can be used with sorting networks for many different types of sort, merely as examples including sorting networks based on bitonic, Bose-Nelson, insertion/bubble-sort, and full-insertion sort methods. A sorting network configured to sort any appropriate number of scores can be generated using conventional techniques.

The probability engine 202 processes the vector of scores to determine a respective "swapping probability" 204 (represented, e.g., as a numerical value between 0 and 1) for each swapping operator in the sorting network. As one way of doing this, the probability engine 202 may sequentially determine a respective swapping probability 204 for each swapping operator, starting from the first swapping operator in the sorting network. The swapping probability for a swapping operator can be understood as a differentiable surrogate for the "hard" inequality (e.g., $x_i \geq x_j$) evaluated by the swapping operator, as described above. The respective swapping probability for each pair of indices may be strictly greater than zero (i.e. greater than and not equal to zero) and strictly less than one (i.e. less than and not equal to one).

In an example implementation before determining the swapping probability for the first swapping operator, the probability engine 202 instantiates a copy of the vector of scores. Then, for each swapping operator starting from the first swapping operator, the probability engine 202 determines the swapping probability for the current swapping operator based on the pair of scores corresponding to the current swapping operator in the current copy of the vector of scores. After determining the swapping probability for the current swapping operator, the probability engine 202 applies the current swapping operator to the current copy of the vector of scores (e.g., in a deterministic fashion that does not depend on the swapping probability). If the current swapping operator is not the last swapping operator, the probability engine 202 then proceeds to the next swapping operator in the sorting network.

A few example techniques by which the probability engine 202 can generate the swapping probability for a swapping operator are described next.

In some implementations, the probability engine 202 can generate a swapping probability $\rho_k$ for the k-th swapping operator as:

$$\rho_k = \sigma\left(\frac{x_i^{(k-1)} - x_j^{(k-1)}}{\nu}\right) \tag{2}$$

where σ(•) is a non-linear activation function (e.g., a sigmoid function), (i,j) is the pair of indices corresponding to the k-th swapping operator, $x^{(k-1)}$ is the current copy of the vector of scores (where $x^{(0)}$ is the original vector of scores), and ν>0 is a dispersion factor. In implementations the dispersion factor is a hyper-parameter, i.e. it may be a factor that is set for the method rather than inferred. Setting ν to a smaller value generally has the effect of increasing the precision of the order statistics generated by the sorting system 200.

In some implementations, the probability engine 202 can condition the generation of the swapping probabilities on a fully sorted version of the vector of scores, and thereby increase the precision of the order statistics and the stability of the numerical operations performed by the sorting system 200. More specifically, the probability engine 202 can generate a swapping probability $\lambda_k$ for the k-th swapping operator based on an error between: (i) the pair of scores corresponding to swapping operator in the current of the vector of scores, and (ii) the pair of scores corresponding to the swapping operator in a fully sorted version of the vector of scores. For example, the probability engine 202 can determine the error as a cost matrix $[C_{ij}]_{i,j=1,2}$, where $C_{ij}=h(y_i-x_j)$, $[x_1, x_2]$ are the pair of scores corresponding to the swapping operator in the current copy of the vector of scores, $[y_1, y_2]$ are the pair of scores corresponding to the swapping operator in the sorted version of the vector of scores, and h(•) is a convex and non-negative function, e.g., $h(z)=z^2$. In this example, the probability engine 202 can use the cost matrix to determine the swapping probability $\lambda_k$ as:

$$\lambda_k = \frac{\exp\left(\frac{C_{ii}+C_{jj}}{\epsilon}\right)}{\exp\left(\frac{C_{ii}+C_{jj}}{\epsilon}\right)+\exp\left(\frac{C_{ij}+C_{ji}}{\epsilon}\right)} \tag{3}$$

where ϵ>0 is a dispersion factor (hyper-parameter). Setting ϵ to a smaller value generally has the effect of increasing the precision of the order statistics generated by the sorting system 200.

As part of conditioning the swapping probabilities on a fully sorted version of the vector of scores, e.g., as described with reference to equation (3), the sorting system 200 can generate the fully sorted version of the vector of scores using any conventional sorting technique, e.g., quicksort or heapsort. The order statistics 108 generated by the sorting system 200 are differentiable irrespective of the differentiability of the operations performed in the conventional sorting technique.

The matrix engine 206 processes the swapping probabilities 204 to generate a respective n×n "soft-swapping" matrix for each swapping operator in the sorting network, where n is the number of scores in the vector of scores. The soft-swapping matrix for a swapping operator can be understood as a differentiable surrogate for the operations performed by the swapping operator. The matrix engine 206 can generate the soft-swapping matrix A each swapping operator, e.g., as:

$$A=(1-\rho)I+\rho E \tag{4}$$

where ρ is the swapping probability for the swapping operator (e.g., generated in accordance with equation (2) or (3)), I is an n×n identity matrix, and E is an n×n exchange matrix. The identity matrix, if applied to (configured such that when applied to) the vector of scores, would leave the vector of scores unchanged. In particular, entries on the diagonal of the identity matrix can have value 1, while non-diagonal entries of the identity matrix can have value 0. The exchange matrix, if applied to (configured such that when applied to) the vector of scores, would swap the pair of scores corresponding to the swapping operator. For example, an exchange matrix that swaps the pair of score at indices (i,j) may have the form:

$$E(m,n) = \begin{cases} 1, & \text{if } (m,n) \in \{(i,j),(j,i),\{(a,a)|a \neq i,j\}\} \\ 0 & \text{otherwise} \end{cases} \tag{5}$$

where E(m, n) denotes the entry of E at position (m, n).

The sorting engine 210 generates the order statistics 108 of the vector of scores 106 using the soft-swapping matrices 208. In general the order statistics 108 may be generated by combining the soft-swapping matrices 208. For example the sorting engine 210 can generate the order statistics O, e.g., as:

$$O=u^T(A_K A_{K-1} \ldots A_2 A_1)\nu \tag{6}$$

where u and ν are tensors (e.g., vectors or matrices) and the $$(A_k)_{k=1}^{K}$$

are the soft-swapping matrices (e.g., generated in accordance with equation (4)). Approximations for a wide variety of order statistics can be generated by appropriate selection of u and ν. For example, selecting u and ν as identity matrices results in the generation of order statistics defining an approximation of the sorting permutation matrix. As another example, selecting u as the final column of an identity matrix and ν as the vector of scores can result in generation of an order statistic that defines an approximation of the maximum value in the vector of scores. As another example, selecting u as the transpose of the first column of an identity matrix and ν as the vector of scores can result in generation of an order statistic that defines an approximation of a minimum value in the vector of scores. As another example, selecting u as an identity matrix and ν as the vector of scores can result in generation of order statistics that define an approximation for a sorted version of the vector of scores. As another example, selecting u as an identity matrix and $$(v[i] = i)_{i=1}^{n}$$

can result in generation of order statistics that define an approximation of a rank ordering of the indices that index the vector of scores. As another example, selecting u as a vector with the first K entries equal to one and the remaining entries equal to zero, and selecting ν as a vector with value one in the entry corresponding to a target index and the remaining entries equal to zero, can result in generating of a top-K order statistic. The top-K order statistic defines whether the indices corresponding to the K scores with the highest values include the target index, and can be used as part of a top-K classification loss, as described above with reference to FIG. 1.

In some cases, the probability engine 202, the matrix engine 206, and the sorting engine 210 operate in synchrony to reduce memory usage during computation of the order statistics 108. For example, separately computing and storing each soft-swapping matrix 208 prior to evaluating equation (6) may consume significant memory resources, which can be avoided by appropriate synchronization. A few example techniques for synchronizing the operations of the probability engine 202, the matrix engine 206, and the sorting engine 210 are described next.

In some implementations, the sorting system 200 initializes an "accumulator" tensor equal to ν, i.e., as described with reference to equation (6). For each swapping operator starting from the first swapping operator in the swapping network, the sorting system 200 can compute the swapping probability and the soft-swapping matrix for the swapping operator, and then apply the soft-swapping matrix to the current accumulator tensor. After updating the current accumulator tensor, the sorting system 200 can proceed to the next swapping operator in the sorting network (if any). The sorting system 200 can thus reduce memory usage by maintaining and updating only the accumulator tensor.

In some implementations, ν is an n×n matrix while u is an n×1 vector, i.e., where u and ν are described with reference to equation (6). In these implementations, initializing an accumulator tensor equal to u and evaluating equation (6) from left to right, i.e., rather than initializing the accumulator tensor equal to ν and evaluating equation (6) from right to left, can achieve significant savings in memory usage. To this end, the sorting system 200 can perform a "forward pass" by computing the swapping probabilities for each swapping operator without computing the soft-swapping matrices. The system can then initialize the accumulator tensor equal to u, and for each swapping operator starting from the last swapping operator, the sorting system 200 can compute the soft-swapping matrix for the swapping operator and apply the soft-swapping matrix to the current accumulator tensor. After updating the current accumulator tensor, the sorting system 200 can proceed to the preceding swapping operator in the sorting network (if any).

In some implementations the method is performed on a computer system comprising a host processor coupled to a co-processor, such as a GPU (Graphics Processing Unit) or TPU (Tensor Processing Unit), configured to perform tensor operations. The computer system may be configured to perform a machine learning task as previously described, in which the host processor receives the input to the machine learning model and arranges for the machine learning model to process the input to generate the output, and in which in which the host processor communicates with the co-processor for the co-processor to generate the order statistics. The co-processor is configured to generate the order statistics as $O=u^T(A_K A_{K-1} \ldots A_2 A_1)\nu$ by using an accumulator tensor as described above, for use in training the machine learning model.

FIG. 3 illustrates the operation of a sorting network. The sorting network illustrated in FIG. 3 has four horizontal "wires," each of which corresponds to a respective score in a vector of scores, and six swapping operators. (Contrary to common notational convention, information is illustrated as flowing from right to left in a sorting network). The pairs of indices defining the swapping operators are denoted $e_k$, the vector of scores being processed by the sorting network is denoted by $x^{(k)}$, and the results of the inequalities evaluated by the sorting network are denoted by $\rho_k$. A sorting system 200 can maintain and use a sorting network as part of generating differentiable order statistics for a vector of scores. In particular, the sorting system 200 can use the sorting network to determine a respective swapping probability for each swapping operator, and then use the swapping operators as weighting factors in computing the differentiable order statistics, as described above with reference to FIG. 2.

Figure 4:
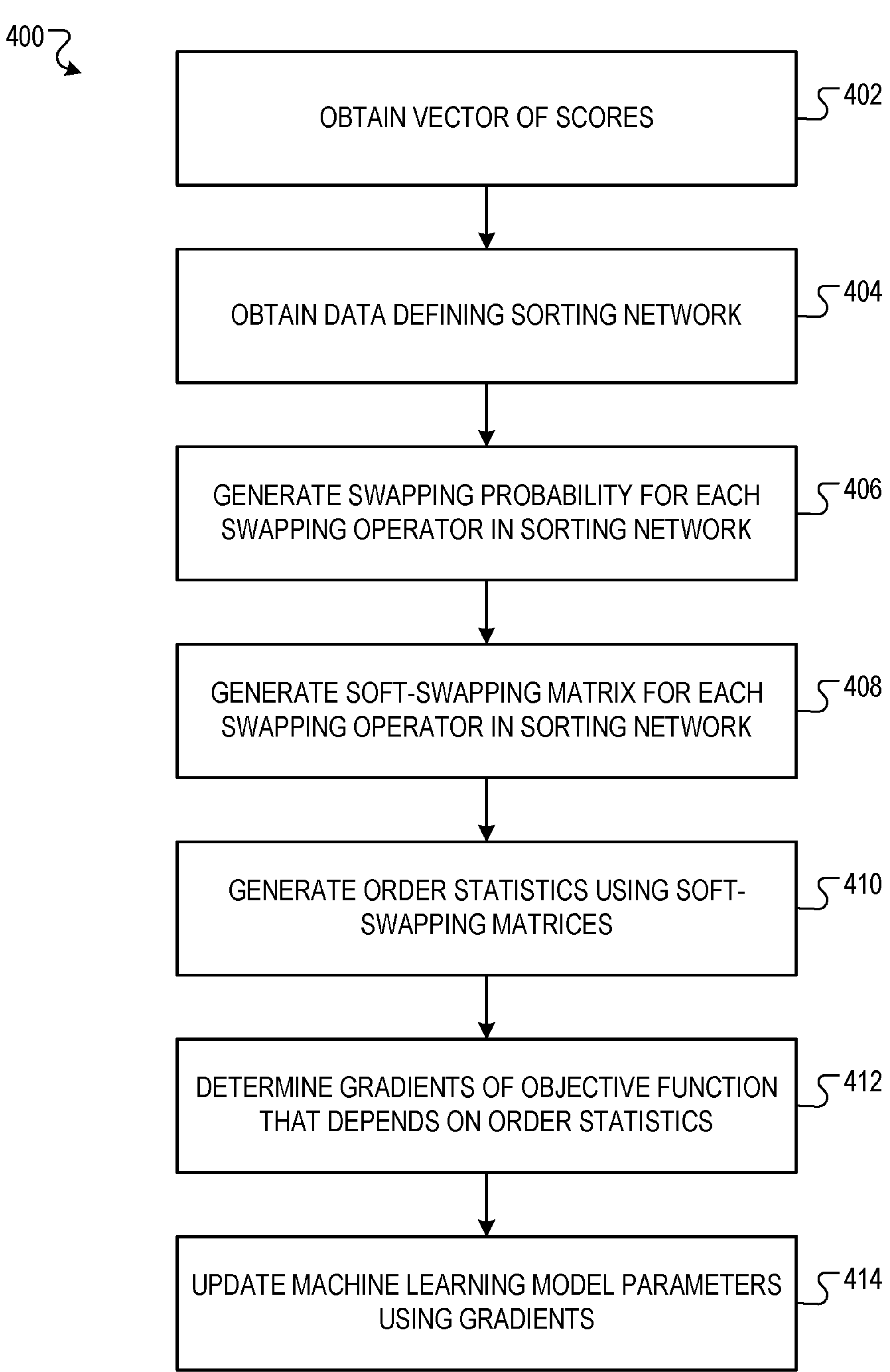
FIG. 4 is a flow diagram of an example process for generating differentiable order statistics for a vector of scores, and training a machine learning model using gradients of an objective function that depends on the differentiable order statistics.

FIG. 4 is a flow diagram of an example process 400 for generating differentiable order statistics for a vector of scores, and training a machine learning model using gradients of an objective function that depends on the differentiable order statistics. For convenience, the process 400 will be described as being performed by a system of one or more computers located in one or more locations.

The system obtains a vector of scores (402). Each position in the vector of scores is associated with a respective index from a set of indices. The vector of scores can be generated, e.g., as the output of a machine learning model, e.g., a neural network model.

The system obtains a sequence of pairs of indices that collectively define a sorting network (404). Each pair of indices includes a respective first index and a respective second index from the set of indices. Each pair of indices defines a "swapping operator" that, when applied to the vector of scores, evaluates an inequality between the pair of scores indexed by the pair of indices. In response to determining that the inequality is satisfied, the swapping operator updates the vector of scores by swapping the pair of scores indexed by the pair of indices. If the inequality is not satisfied, then the swapping operator refrains from updating the vector of scores. Applying the sorting network to any vector of scores, i.e., by sequentially applying each swapping operator in the sorting network to the vector of scores, has the effect of sorting the entries of the vector of scores.

The system generates a respective swapping probability for each swapping operator in the sorting network based on the vector of scores (406). For example, the system can sequentially generate a respective swapping probability for each swapping operator starting from the first swapping operator. More specifically, for each swapping operator, the system can determine the swapping probability for the swapping operator based on a pair of scores corresponding to the swapping operator in a current copy of the vector of scores. The system can then apply the swapping operator to the current copy of the vector of scores before proceeding to the next swapping operator in the sorting network.

The system generates a respective soft-swapping matrix for each swapping operator in the sorting network using the swapping probabilities (408). The system can generate, for each swapping operator, a respective soft-swapping matrix for the swapping operator as a combination of: (i) an identity matrix that, if applied to the vector of scores, would leave the vector of scores unchanged, and (ii) an exchange matrix that, if applied to the vector of scores, would swap a pair of scores corresponding to the swapping operator. The exchange matrix for a swapping operator can be weighted by the swapping probability for the swapping operator.

The system generates differentiable order statistics for the vector of scores using, e.g. by combining, the soft-swapping matrices (410). For example, the system can generate the order statistics using a matrix product of the soft-swapping matrices.

The system determines gradients of the differentiable order statistics with respect to the machine learning model parameters (412). For example, the system can backpropagate gradients of the differentiable order statistics into a set of model parameters of the machine learning model.

The system updates the values of the machine learning model parameters using the gradients of the differentiable order statistics with respect to the machine learning model parameters (414). For example, the system can update the values of the machine learning model parameters using the gradients in accordance with a gradient descent optimization rule.

Figures 5, 6:
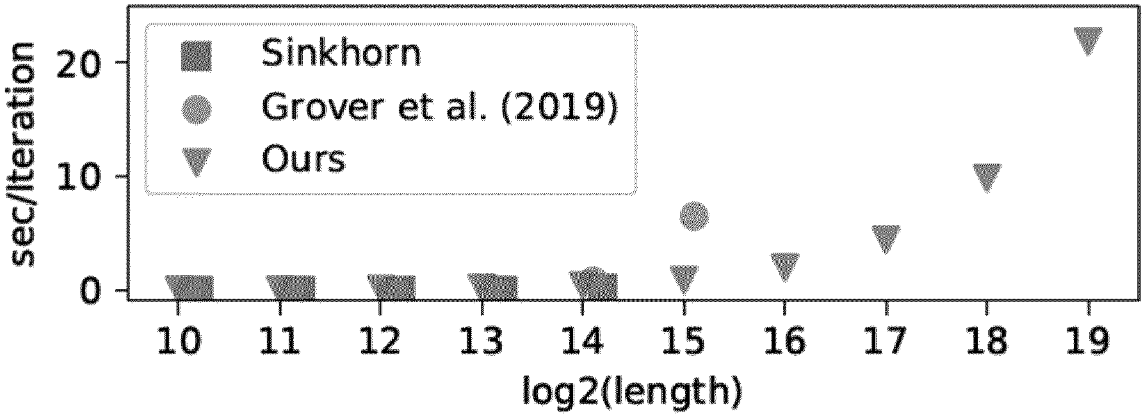
FIG. 5 shows the test accuracy of a k-nearest neighbor classifier implemented using an embedding neural network that is trained using differentiable order statistics.
FIG. 6 shows the running time of computing gradients of order statistics generated using: (i) the sorting system described in this specification ("ours"), and (ii) alternative methods ("Sinkhorn" and "Grover et al. (2019)").

FIG. 5 shows the test accuracy of a k-nearest neighbor classifier implemented using: (i) an embedding neural network that is trained using differentiable order statistics, as described above with reference to FIG. 1 ("ours"), and (ii) an alternative method ("Grover et al. (2019)"). The test accuracy of the k-nearest neighbor classifier is computed with reference to various values of n, where n denotes the number of candidate inputs from which the k nearest neighbors of a query input are selected, as described above with reference to FIG. 1. It can be appreciated implementing the k-nearest neighbor classifier using an embedding neural network that is trained using differentiable order statistics enables an increase in test accuracy, e.g., compared to implementing the k-nearest neighbor classifier using the alternative method.

FIG. 6 shows the running time of computing gradients of order statistics generated using: (i) the sorting system described in this specification ("ours"), and (ii) alternative methods ("Sinkhorn" and "Grover et al. (2019)"). More specifically, the vertical axes shows the time to compute gradients (e.g., in seconds per training iteration), while the horizontal axis shows the logarithm of the length of the sequence being sorted. The sorting system described in this specification can have computational complexity of $O(n \log(n)^2)$, while the other algorithms can, in some cases, have computational complexity of $O(n^2)$. Thus the alternative methods could not be tested of length greater than $2^{16}$, i.e., because of their computational complexity. In contrast, due to its lower computational complexity, the sorting system described in this specification could be applied to sort sequences of length at least $2^{19}$.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

The invention claimed is:

1. A method performed by one or more data processing apparatus for generating one or more differentiable order statistics for a vector of scores, the method comprising:

obtaining the vector of scores, wherein each position in the vector of scores is associated with a respective index from a set of indices, and wherein obtaining the vector of scores comprises generating each score in the vector of scores as an output of a machine learning model having a plurality of machine learning model parameters;

obtaining a plurality of pairs of indices, wherein each pair of indices comprises a respective first index and a respective second index from the set of indices;

generating a respective swapping probability for each pair of indices based on the vector of scores;

generating, for each pair of indices, a respective soft-swapping matrix for the pair of indices as a combination of: (i) an identity matrix that, if applied to the vector of scores, would leave the vector of scores unchanged, wherein the identity matrix is weighted in the combination by a complement of the swapping probability for the pair of indices, and (ii) an exchange matrix that, if applied to the vector of scores, would swap a pair of scores indexed by the pair of indices, wherein the exchange matrix is weighted in the combination by the swapping probability for the pair of indices;

generating the one or more differentiable order statistics for the vector of scores using the soft-swapping matrices; and training the machine learning model parameters using an objective function that depends on the one or more differentiable order statistics.

2. The method of claim 1, wherein training the machine learning model parameters using an objective function that depends on the differentiable order statistics comprises:

determining gradients of the differentiable order statistics with respect to the machine learning model parameters; and updating values of the machine learning model parameters using the gradients of the differentiable order statistics with respect to the machine learning model parameters.

3. The method of claim 2, wherein the differentiable order statistics include a top-K order statistic that defines whether a target index is included in a set of indices of the K highest scores from the vector of scores.

4. The method of claim 3, wherein the machine learning model comprises a neural network.

5. The method of claim 1, wherein the respective swapping probability for each pair of indices is strictly greater than zero and strictly less than one.

6. The method of claim 1, wherein for each pair of indices, the soft-swapping matrix for the pair of indices is generated as:

$$(1-\rho)I+\rho E,$$

wherein ρ is the swapping probability, I is the identity matrix, and E is the exchange matrix.

7. The method of claim 1, wherein the plurality of pairs of indices are associated with a sequential ordering, wherein the swapping probabilities for the pairs of indices are sequentially generated starting from a first pair of indices in the sequential ordering of the pairs of indices, and wherein for each pair of indices, generating the swapping probability for the pair of indices comprises:

determining the swapping probability for the pair of indices based on a pair of scores indexed by the pair of indices in a current copy of the vector of scores; and applying a swapping operator associated with the pair of indices to the current copy of the vector of scores, wherein the swapping operator is from a sequence of swapping operators that define a sorting network.

8. The method of claim 7, wherein applying the swapping operator associated with the pair of indices to the current copy of the vector of scores comprises:

evaluating an inequality between the pair of scores indexed by the pair of indices in the current copy of the vector of scores; and in response to determining that the inequality is satisfied, swapping the pair of scores indexed by the pair of indices in the current copy of the vector of scores.

9. The method of claim 7, wherein generating the swapping probability for a final pair of indices comprises applying a final swapping operator to the current copy of the vector of scores, and wherein after applying the final swapping operator, the scores in the current copy of the vector of scores are sorted.

10. The method of claim 7, wherein for each pair of indices, determining the swapping probability for the pair of indices based on the pair of scores indexed by the pair of indices in a current copy of the vector of scores, comprises:

determining a difference between the pair of scores indexed by the pair of indices in the current copy of the vector of scores;

determining a product of an inverse of a dispersion factor and the difference between the pair of scores indexed by the pair of indices in the current copy of the vector of scores; and determining the swapping probability by applying a sigmoid function to a result of the product.

11. The method of claim 7, further comprising obtaining a sorted version of the vector of scores; and wherein for each pair of indices, determining the swapping probability for the pair of indices based on the pair of scores indexed by the pair of indices in the current copy of the vector of scores, comprises:

determining an error between: (i) the pair of scores indexed by the pair of indices in the current copy of the vector of scores, and (ii) a pair of scores indexed by the pair of indices in the sorted version of the vector of scores; and determining the swapping probability based on the error.

12. The method of claim 11, wherein for each pair of indices, determining the error between: (i) the pair of scores indexed by the pair of indices in the current copy of the vector of scores, and (ii) the pair of scores indexed by the pair of indices in the sorted version of the vector of scores, comprises:

determining a cost matrix $[C_{ij}]_{i,j=1,2}$, where $C_{ij}=h(y_i-x_j)$, $[x_1, x_2]$ are the pair of scores indexed by the pair of indices in the current copy of the vector of scores, $[y_1,y_2]$ are the pair of scores indexed by the pair of indices in the sorted version of the vector of scores, and h(•) is a convex and non-negative function.

13. The method of claim 12, wherein for each pair of indices, determining the swapping probability based on the error comprises determining the swapping probability 2 as:

$$\lambda = \frac{\exp\left(\frac{C_{ii}+C_{jj}}{\epsilon}\right)}{\exp\left(\frac{C_{ii}+C_{jj}}{\epsilon}\right)+\exp\left(\frac{C_{ij}+C_{ji}}{\epsilon}\right)}$$

where ϵ is a dispersion factor.

14. The method of claim 1, wherein generating the one or more differentiable order statistics for the vector of scores using the soft-swapping matrices comprises:

generating a matrix product of the soft-swapping matrices; and generating the one or more differentiable order statistics based on the matrix product of the soft-swapping matrices.

15. The method of claim 14, wherein the one or more differentiable order statistics comprise a sorted version of the vector of scores, and wherein generating the sorted version of the vector of scores comprises:

determining a product of: (i) the matrix product of the soft-swapping matrices, and (ii) the vector of scores.

16. The method of claim 14, wherein the one or more differentiable order statistics comprise a maximum score in the vector of scores, and wherein generating the maximum score in the vector of scores comprises:

determining a product of: (i) a transpose of a final column of an identity matrix, (ii) the matrix product of the soft-swapping matrices, and (iii) the vector of scores.

17. The method of claim 14, wherein the one or more differentiable order statistics comprise a minimum score in the vector of scores, and wherein generating the minimum sore in the vector of scores comprises:

determining a product of: (i) a transpose of a first column of an identity matrix, (ii) the matrix product of the soft-swapping matrices, and (iii) the vector of scores.

18. One or more non-transitory computer storage media storing instructions that when executed by one or more computers cause the one or more computers to perform operations for generating one or more differentiable order statistics for a vector of scores, the operations comprising:

obtaining the vector of scores, wherein each position in the vector of scores is associated with a respective index from a set of indices, and wherein obtaining the vector of scores comprises generating each score in the vector of scores as an output of a machine learning model having a plurality of machine learning model parameters;

obtaining a plurality of pairs of indices, wherein each pair of indices comprises a respective first index and a respective second index from the set of indices;

generating a respective swapping probability for each pair of indices based on the vector of scores;

generating, for each pair of indices, a respective soft-swapping matrix for the pair of indices as a combination of: (i) an identity matrix that, if applied to the vector of scores, would leave the vector of scores unchanged, wherein the identity matrix is weighted in the combination by a complement of the swapping probability for the pair of indices, and (ii) an exchange matrix that, if applied to the vector of scores, would swap a pair of scores indexed by the pair of indices, wherein the exchange matrix is weighted in the combination by the swapping probability for the pair of indices;

generating the one or more differentiable order statistics for the vector of scores using the soft-swapping matrices; and training the machine learning model parameters using an objective function that depends on the one or more differentiable order statistics.

19. A system comprising:

one or more computers; and one or more storage devices communicatively coupled to the one or more computers, wherein the one or more storage devices store instructions that, when executed by the one or more computers, cause the one or more computers to perform operations for generating one or more differentiable order statistics for a vector of scores, the operations comprising:

obtaining the vector of scores, wherein each position in the vector of scores is associated with a respective index from a set of indices, and wherein obtaining the vector of scores comprises generating each score in the vector of scores as an output of a machine learning model having a plurality of machine learning model parameters;

obtaining a plurality of pairs of indices, wherein each pair of indices comprises a respective first index and a respective second index from the set of indices;

generating a respective swapping probability for each pair of indices based on the vector of scores;

generating, for each pair of indices, a respective soft-swapping matrix for the pair of indices as a combination of: (i) an identity matrix that, if applied to the vector of scores, would leave the vector of scores unchanged, wherein the identity matrix is weighted in the combination by a complement of the swapping probability for the pair of indices, and (ii) an exchange matrix that, if applied to the vector of scores, would swap a pair of scores indexed by the pair of indices, wherein the exchange matrix is weighted in the combination by the swapping probability for the pair of indices;

generating the one or more differentiable order statistics for the vector of scores using the soft-swapping matrices; and training the machine learning model parameters using an objective function that depends on the one or more differentiable order statistics.

20. The system of claim 19, wherein training the machine learning model parameters using an objective function that depends on the differentiable order statistics comprises:

determining gradients of the differentiable order statistics with respect to the machine learning model parameters; and updating values of the machine learning model parameters using the gradients of the differentiable order statistics with respect to the machine learning model parameters.

* * * * *